Patented Nov. 3, 1936

2,059,469

UNITED STATES PATENT OFFICE 2,059,469

METHOD OF TREATING ORGANIC LIQUIDS WITH PHOSPHORUS PENTOXIDE

Boris Malishev, Berkeley, Calif.

No Drawing. Application October 14, 1935, Serial No. 45,000

6 Claims. (Cl. 196—23)

This invention relates to an improvement in the art of treating organic liquids with phosphorus pentoxide, and in particular discloses an improved method of bringing the $P_2O_5$ into intimate contact with the treating liquid.

In my U. S. Patent 1,914,953 and co-pending applications, Serials 700,751 and 700,752 filed December 2, 1933, I have described methods for treating hydrocarbon oils or substitutes thereof with $P_2O_5$. It has been pointed out that in order to obtain the desired treating effect, the $P_2O_5$ must be held in a fine state of division, such as when suspended in the liquid to be treated. $P_2O_5$ suspended in hydrocarbon liquids, however, has a strong tendency to coagulate, thereby forming hard lumps of small surface area, unless peptizing agents of the nature of oxy-organic acidic compounds are present and frequently the addition of churning agents such as sand is necessary to prevent lumping.

I have found that compounds which are suitable for peptization of the $P_2O_5$ consume considerable quantities of this catalyst, by forming organic phosphorus compounds. In a process of treating cracked petroleum distillates for the production of motor fuels, much of the economical success of the operation depends upon the consumption of $P_2O_5$, and every effort must be made to reduce it to a minimum without impairing the efficiency of the process.

My improved method of treating comprises removing $P_2O_5$-consuming substances, other than those for which the treatment is intended, to the largest practical extent by suitable pretreatment and then exposing the liquid so treated to $P_2O_5$ which is held in a fine state of division by mechanical means.

A practical method for maintaining the necessary state of division consists of depositing the $P_2O_5$ on a porous solid carrier. A catalytic mass prepared thereby may either be ground finely and be agitated with the liquid to be treated, or it may be charged into a suitable tower to form a filter-like bed through which the liquid or vapors to be treated may be passed.

To prepare the $P_2O_5$ catalytic mass I generally proceed as follows: A suitable inert carrier such as metallurgical coke, unglazed tile, porous calcined clay, slag, etc., of suitable mesh size is slightly wetted with the liquid to be treated or with any other inert liquid for the purpose of improving its adhering qualities. The $P_2O_5$ powder is added and thoroughly mixed with it. In a specific example 3,000 grams of 8 mesh metallurgical coke are dried at 110° C. to remove last traces of moisture. 100 grams of pressure distillate are added to effect slight moistening of the coke, 300 grams of finely ground $P_2O_5$ are mixed with the coke and thoroughly distributed. The mixing operation may be carried out in a horizontal, slowly rotating closed drum.

I have found that metallurgical coke as a solid carrier produces particularly good results with respect to economy as well as efficiency of the powdered $P_2O_5$ deposited thereon. Coke, being fully inert towards $P_2O_5$ under the conditions of the treatment, does not contribute to the consumption of the latter, and the degree of its porosity seems to be just right to hold the powdered $P_2O_5$ in the proper dispersion for optimum efficiency. In contrast to coke many solid carriers commonly employed are not fully inert. For instance many minerals, such as clays, pumice, etc. tend to liberate water at certain temperatures which obviously destroy the $P_2O_5$, and moreover $P_2O_5$ attacks many silicates under the conditions of treatment.

Another method of preparing the catalytic mass consists of burning elemental phosphorus in admixture with the carrier; or else, a stream of air used for the combustion of phosphorus and containing suspended $P_2O_5$ particles may be conducted through a mass of carrier material whereby the $P_2O_5$ dust is deposited thereon. There are, of course, other ways in which to deposit $P_2O_5$ on a solid carrier and it shall be understood that such methods do not form a part of this invention.

Pre-treatments for the removal of $P_2O_5$-consuming impurities from the treating liquid consists chiefly of acid, caustic and/or clay treatment, although distillation, solvent extraction, etc., may be applied also. The combination of pre-treating steps depends entirely upon the nature of the treating stock and the impurities contained therein. In my U. S. Patent 1,914,953 I have recommended a dilute sulfuric acid treatment for the removal of nitrogen bases. Distillates which are free from basic components may not require an acid wash, but demand treatment with alkali or alkaline earth or its equivalent such as ammonia, sodium sulphide, barium sulphide, etc., for the removal of acidic oxygen and/or sulfur-bearing compounds which are the components mainly responsible for excessive $P_2O_5$ consumption. Sometimes it is very advantageous to first treat with caustic and then acid, or first with acid followed by a suitable clay capable of removing acid oils. In some cases selective extraction may be helpful. Each treating stock presents its own problem and the optimum procedure for pre-treating is preferably determined from case to case.

It shall be understood that when sulfuric acid or any other treating is resorted to as a step preliminary to $P_2O_5$ treatment, such treatment is advantageously carried out under conditions in which introduction of $P_2O_5$-consuming reaction products is prevented. Moreover, it is not the purpose of the sulfuric acid treatment to produce an oil which is more or less sufficiently treated. An acid treatment of such intensity usually results in high loss of distillate as well as loss of desirable properties such as octane number, and the primary purpose of the $P_2O_5$ treatment which is to provide for a satisfactory treatment under conditions which preserve material as well as desirable properties, would be defeated.

The $P_2O_5$ consumption in my present method of treating has been reduced to an average of the order of .05% of the treated distillate which is about one-tenth of the losses suffered in the presence of peptizing agents in quantities sufficient to be effective for peptization.

In an illustrative example 150 gallons of pressure distillate produced from California crude were washed first with 20 Bé. caustic solution and then with sulfuric acid of 50% concentration. Sludge was separated and the distillate was dried by filtering through salt. The dry product was pumped at 275° C., 200 lbs. pressure and at the rate of 1½ gallons per hour through a bed 5 feet high consisting of 3000 grams 8 mesh coke on which 300 grams $P_2O_5$ had been deposited. After passage through the bed the distillate was allowed to vaporize with the aid of steam and was then condensed. The product had a color of 25 as measured by the Saybolt colorimeter and was stable to light and in storage. Consumption of $P_2O_5$ amounted to about .05% of the distillate.

In another example, benzene was pumped through a bed of a catalytic mass consisting of $P_2O_5$ suspended on calcined pumice. Ethylene was forced through it at a pressure of 400 lbs. in countercurrent to the benzene. The liquid issuing was fractionated to separate ethyl benzene from unreacted benzene. Ethylizing was 90% complete.

I claim as my invention:

1. In the process of treating an organic liquid with $P_2O_5$ said liquid containing impurities capable of peptizing and consuming $P_2O_5$, the steps of pretreating said liquid with an alkaline reacting reagent substantially to remove said impurities and thereafter contacting the liquid with solid $P_2O_5$ which is prevented from coagulating by mechanical means in the absence of a peptizing agent.

2. The process of claim 1 in which the organic liquid is a hydrocarbon oil.

3. In the process of treating a hydrocarbon oil with $P_2O_5$, said oil containing acidic impurities capable of peptizing and consuming $P_2O_5$, the steps of treating the oil with a strong caustic solution, drying the oil and contacting it with solid $P_2O_5$ which is prevented from coagulating by mechanical means in the absence of a peptizing agent.

4. In the process of treating an organic liquid with $P_2O_5$ said liquid containing impurities capable of peptizing and consuming $P_2O_5$, the steps of pretreating said liquid with an alkaline reacting reagent substantially to remove said impurities and thereafter contacting the liquid with solid $P_2O_5$ suspended in a finely divided state on a solid porous carrier which is fully inert toward $P_2O_5$ under the conditions of the treatment.

5. In the process of treating an organic liquid with $P_2O_5$ said liquid containing impurities capable of peptizing and consuming $P_2O_5$, the steps of pretreating said liquid with an alkaline reacting reagent substantially to remove said impurities and thereafter contacting the liquid with finely divided solid $P_2O_5$ deposited on a solid carrier of the type of metallurgical coke.

6. In the process of treating an organic liquid with $P_2O_5$, said liquid containing impurities capable of peptizing and consuming $P_2O_5$, the steps of pretreating said liquid with an alkaline reacting reagent substantially to remove said impurities and thereafter contacting the liquid with finely divided solid $P_2O_5$ deposited on metallurgical coke.

BORIS MALISHEV.